March 17, 1953  J. VOCELKA  2,631,732
FIBER DISK FILTER ASSEMBLY
Filed Nov. 8, 1950  2 SHEETS—SHEET 2

Inventor
John Vocelka
by Parker + Carter
Attorneys

Patented Mar. 17, 1953

2,631,732

UNITED STATES PATENT OFFICE 2,631,732

FIBER DISK FILTER ASSEMBLY

John Vocelka, Elmwood Park, Ill., assignor to Wm. W. Nugent & Co., Inc., Chicago, Ill., a corporation of Illinois Application November 8, 1950, Serial No. 194,668

3 Claims. (Cl. 210—169)

This invention relates to improvements in filters, and more particularly to filters employing filter stacks made up of a plurality of fiber discs arranged in generally concentric relation within a filter casing for filtering liquid which is passed either from the exterior to the interior of the filter stack or vice versa.

The principal object of the invention is to provide an improved form and arrangement of filter stack including a plurality of filter stacks arranged to provide maximum filtering capacity when used for liquids, such as oil, water and the like.

A further object of the invention is to provide an improved form and arrangement of filter stack including a plurality of discs the bodies of which are alternately uncut and cut out to form inlet and outlet openings communicating with the interior and exterior thereof, and with the cutout discs arranged in a predetermined position in the filter stack so as to afford filtering action, both through the intermediate uncut discs in an axial direction and through adjacent portions of the same disc.

The invention may best be understood by reference to the accompanying drawings, in which.

Figure 1:
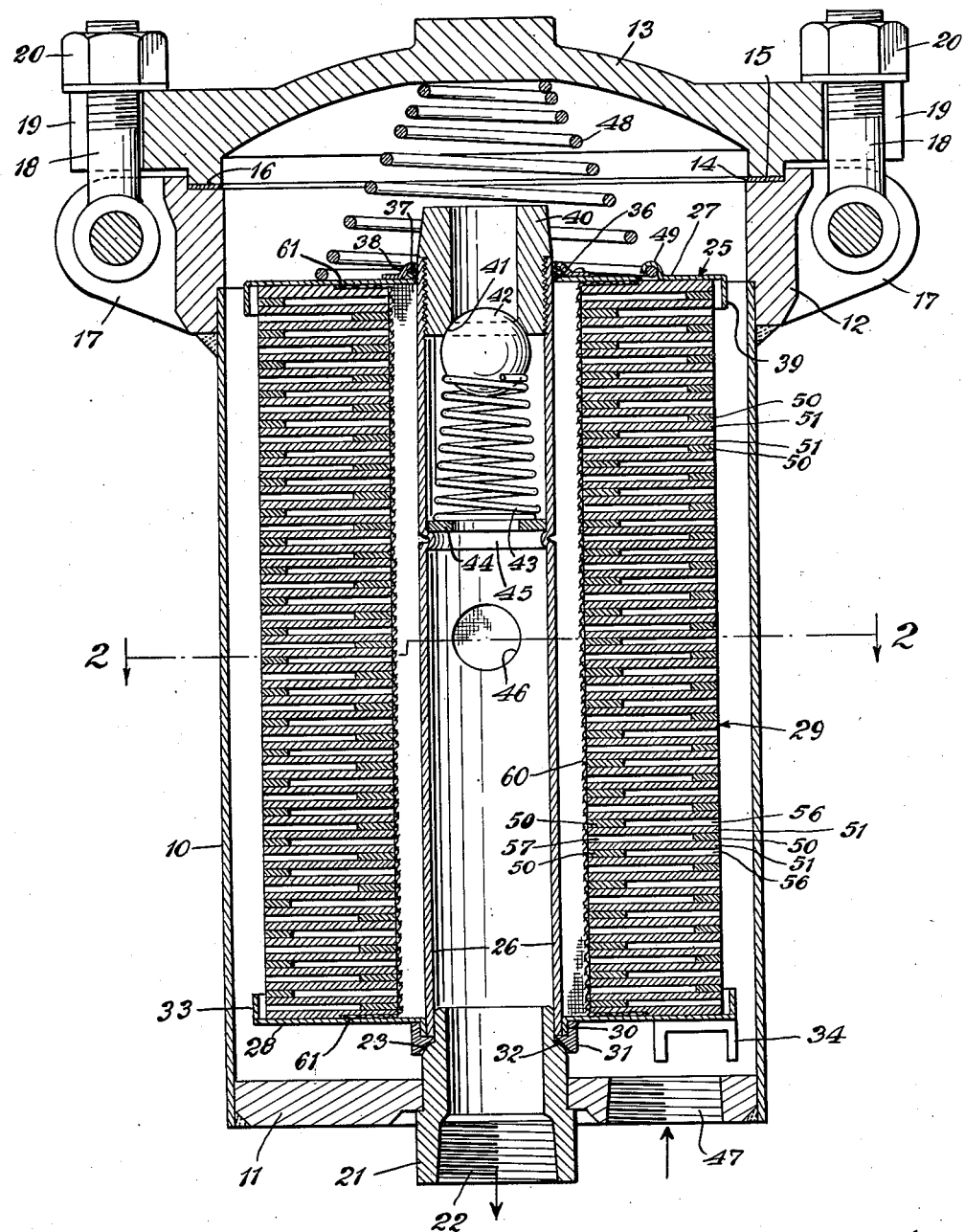
Figure 1 is a vertical cross-sectional view taken through a filter having a filtering stack embodying my invention.

Referring now to details of the embodiment of my invention illustrated in the drawings, the filter unit includes a cylindrical casing 10 having an integral bottom 11 and an upper rim 12 with a suitable circular cover 13 forming a closure for the open end of the casing. A gasket 14 rests upon a seat 15 of the rim 12 and is engaged by a bearing portion 16 of the cover. The cover is secured to the casing by a pair of lugs 17, 17 each having a bolt 18 pivoted thereto and adapted to be swung into upright slots 19, 19 formed in the periphery of the cover 13. The bolts 18 have nuts 20 threaded in their outer ends for engaging the upper surface of the cover adjacent the edges of the slots 19 and, as a result, press the cover 13 firmly against the gasket to form a liquid-type closure.

A hollow stud 21 is fixed in and extends through the bottom wall 11. The lower end of the stud 21 is threaded interiorly at 22 adapted for connection by a suitable communicating pipe. The upper end of said stud is exteriorly beaded at 23 to form a seat for a detachable filter unit indicated generally at 25.

The filter unit 25 consists essentially of a central tube 26, a top plate 27, a bottom plate 28 and a stack of filter discs indicated generally at 29 interposed between said top and bottom plates. In the form shown herein, the bottom plate 28 is centrally apertured with a flange 30 which surrounds and is fixed to the lower end of the central tube 26. A ring 31 is secured to the flange 20, said ring having an interior tapered surface 32 adapted to engage the seating surface 23 of the stud 21. The bottom plate 28 has a peripheral flange 33 for receiving the lower end of the filter stack 29 therein. A plurality of supporting legs 34, herein consisting of U-shaped lugs of greater height than the lower face of the seating ring 31, may be attached to the under face of the bottom plate 28 so as to permit the entire unit to be supported in standing position when it is removed from the filter casing.

The top plate 27 is centrally apertured at 36 for relative sliding engagement along the upper end of the central tube 26. In order to seal the joint between the top plate and central tube during sliding adjustment, an O-ring 37 of suitable elastic material is held by an annular retaining ring 38 about the face of the top surface of the aperture 36 in yielding engagement against the tube 26. The top plate has a depending peripheral flange 39 for receiving the upper end of the filter stack 29.

The upper end of the central tube 26 has a hollow plug 40 threaded therein, the lower face of which has an annular seat 41 for a ball check 42. Said ball check is normally urged against the seat 41 by a coil spring 43 having its lower end abutting an annular collar 44 sitting against an inwardly offset annular rib 45 in the tube 26. The ball check device just described forms a check valve for relieving excess pressure of liquid within the casing when the central tube 26 is arranged, as shown herein, as the outlet passage of the filter unit and liquid is supplied to the unit through an inlet passage 47, in the bottom wall of the casing.

The central tube 26 has one or more perforations 46 intermediate its ends, for passage of liquid from the filter stack 29 to the interior of said tube.

The filter unit is held in place within the casing by a coil spring 48, preferably tapered so that its smaller end engages the under face of the cover 13 centrally thereof and its larger lower end engages the top plate 27. In the form shown, the lower end of the coil spring 48 is permanently secured to the top plate by a clip 49 formed integrally with said plate and bent upwardly and secured around the spring wire, as shown in Figure 1.

Figure 4:
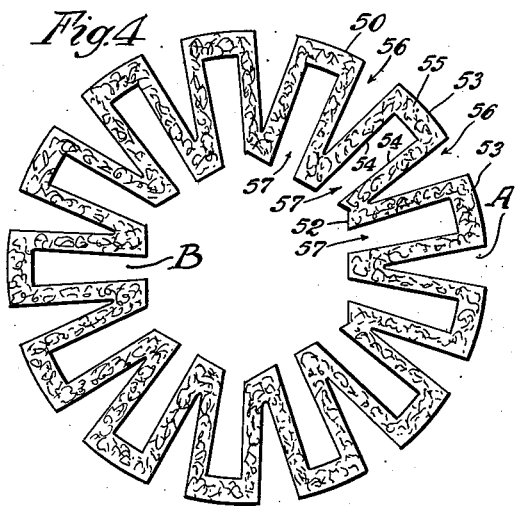
Figure 4 is a plan view of one form of filter disc used in the stack.
Figure 5:
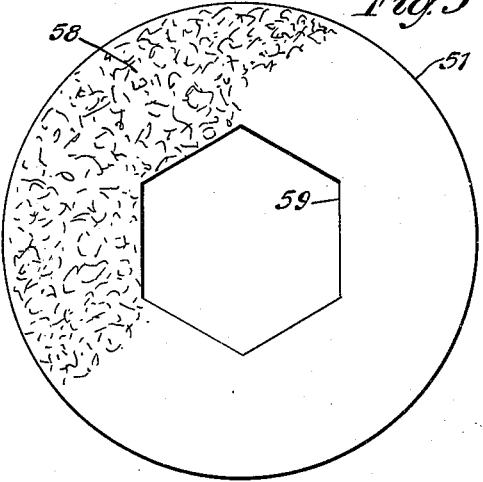
Figure 5 is a plan view of another form of filter disc disposed alternately in the stack with the form of disc shown in Figure 4.

Referring now to details of the filter stack which constitutes the principal feature of my invention, the stack indicated generally at 29 is made up of a large number of discs of two different kinds, one of which is indicated at 50 in Figure 4 and the other of which is indicated at 51 in Figure 5. These discs are made of a suitable sheet fibrous material, such as wood pulp, paper, felt or spun glass, capable of affording filtering action for a liquid when forced under pressure therethrough from an inlet passage to an outlet passage of the stack.

Each disc 50 is cut out at its center with an aperture 52 preferably of a regular polygonal shape, herein in the form of a hexagon. The remaining peripheral body portion of the disc 50 is formed in a series of radially extending lobes or loops 53, 53. As shown in Figure 4, each of said lobes includes side walls 54, 54 and an outer end wall 55 continuous therewith along the periphery of the disc. The inner ends of the side walls 54 are also continuous with the adjacent side walls of approximate lobes. In effect therefore, each disc 50 consists of a continuous web of filtering material formed in recurrent loops extending around the central opening 52 and all in the same plane, to give a generally crenelated appearance. Said loops are open along their outer sides to the periphery of the disc, as indicated at 56, 56 and are open along their inner sides, as indicated at 57, 57 to the central aperture 52 of the disc. In the preferred form shown, the side walls 54 and end walls 55 of the loops are all of substantially the same width in the plane of the disc.

For the purpose of the present description, the outer V-shaped openings 56 of the crenelated discs 50 may be considered as inlet openings, and the inner openings 57 communicating with the central aperture 52 may be considered as outlet openings. As will presently appear, parts of the filter can be rearranged so that liquid may be passed through the stack in a reverse direction, whereupon the outer V-shaped openings 56 will be outlet openings and the inner openings 57 will be the inlet openings.

The intermediate discs 51 are of the same outer diameter as the crenelated discs 50 and are also provided with central apertures 59 of the same shape and size as the central apertures 52 of the discs 50, but the peripheral body of discs 51 are uncut intermediate their outer peripheries and their central apertures.

Figure 2:
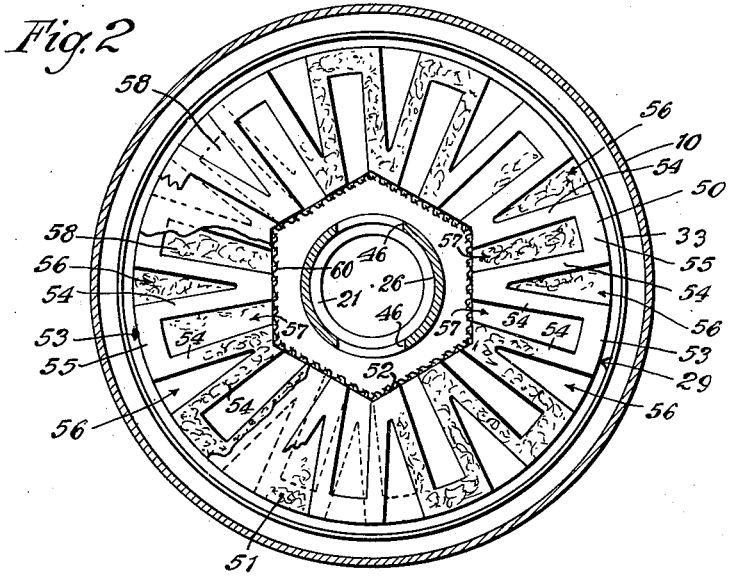
Figure 2 is a section taken on line 2—2 of Figure 1, with parts of the uppermost filter disc broken away to show the relative position of adjacent filter discs in the stack.
Figure 3:
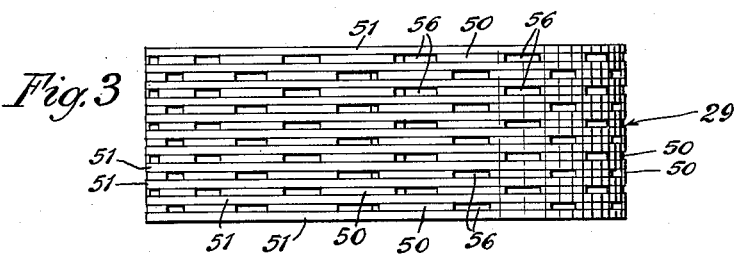
Figure 3 is a detailed side view of a plurality of discs stacked one on top of another, forming part of the entire filter stack used in the filter shown in Figure 1.

As will be seen from Figures 2 and 3, the discs 50 and 51 are stacked alternately with each other in the finished stack 29, but each crenelated disc 50 is disposed with respect to the next crenelated disc 50 on the opposite side of an intermediate disc 51 so that the V-shaped outlet opening of one disc 50 registers with an inlet opening 57 of the next succeeding crenelated disc 50 in the stack.

To aid in positioning of the inlet and outlet openings of successive crenelated discs in the proper angular or circumferentially offset relation to each other as just described, the crenelated discs 50 and the uncut discs 51 may be stacked alternately on a mandrel (not shown) of the same shape and size as the polygonal central apertures 52 and 59 of said disc but with each succeeding crenelated disc 50 disposed at a different angle on the mandrel. In the form of disc shown in Figure 4, it will be observed that the central aperture 52 is a polygon having an even number of sides, herein six in number, whereas the periphery of the disc is formed with an uneven number of lobes, herein thirteen in number. One of the inlet openings indicated at A in this figure is centered at the right-hand side of the central aperture 52, while an outlet opening B on the opposite or left-hand side of said aperture is in diametrically opposed relation to the inlet opening A. In the completed stack, each successive crenelated disc 50 is turned through an angle of 180 degrees with respect to the preceding crenelated disc in the stack, so as to insure registering relationship between the inlet and outlet openings of succeeding crenelated discs, as shown in Figure 2.

The same result can be attained by inverting successive crenelated discs as they are stacked.

The resulting stack, when in assembled relation as shown in Figures 1 and 2, presents a filtering structure wherein each inlet opening registers with a substantial portion of an outlet opening in the second proximate crenelated disc and separated therefrom by an intermediate imperforate area 58 of an intermediate disc 51. Thus, the lobes of successive crenelated discs 50 are disposed in staggered relation throughout the length of the stack, as is best seen in Figure 3.

With the staggered arrangement of the crenelated discs 50 as described, a filtering action takes place both through the intermediate discs in the stack, and also through the side and end walls of each crenelated disc, as follows:

Liquid passing into each of the inlet openings 56 from the exterior of the stack will be filtered by passing through the intermediate areas 58, 58 of both the overlying and underlying uncut discs 51 into the registering outlet openings 57, 57 in the next crenelated discs 50 above and below the first-named crenelated disc. Also, liquid will be filtered by passing directly through the side and end walls 54 and 55 of each crenelated disc 50 into the adjacent outlet openings 57 of the same disc.

In the preferred form of filter stack shown in Figures 1 and 2, a length of tubular stockinet or woven fabric 60 is fitted lengthwise within the central opening of said stack with its upper and lower ends turned outwardly as indicated at 61, 61 and secured by pressure normally maintained on the stack between the uppermost and lowermost discs and the proximate faces of the top and bottom plates 27, 28. This stockinet provides relatively fine filtering action in addition to that provided by the filter stack, and in particular serves to filter out any loose fibers which may escape from the fiber discs of the stack toward the filter outlet.

The use and operation of the filter unit above described, and particularly the novel form of filter stack, is as follows:

The individual filter discs 50 and 51 are cut out or stamped, preferably with suitable dies, in the forms shown in Figures 4 and 5. The two forms of discs are then stacked alternately with each other but with each crenelated disc 50, of the kind shown in Figure 4, having its inlet openings 56 disposed in axially registering relation with the outlet openings 57 of the preceding crenelated disc 50 in the stack. In the form of disc shown in Figure 4, there is an uneven number of lobes or loops in the disc, so that one inlet opening is diametrically opposite an outlet opening on the other side of the disc. Each successive disc may be turned at an angle of 180 degrees to the preceding crenelated disc in the stack to insure the desired relationship of inlet and outlet openings. The same relationship between successive crenelated discs will result if each successive crenelated disc is reversed or turned over as it is assembled in the stack.

When the two kinds of discs are stacked in their proper angular relationship, to the desired height of the stack, the stockinet 60 is then inserted in the central opening of the stack and the entire stack is then mounted between the end plates 27, 28 with the central tube 26 of the detachable filter unit projecting through the central opening of the stack.

The discs may be retained in their proper angular relation during subsequent handling of the stack, by maintaining moderate endwise pressure on the stack sufficient to hold the individual discs in place by friction against each other, until the stack is assembled in the detachable filter unit, including the central tube 26 and end plates 27 and 28 with the filter stack 29 mounted therebetween. When the filter unit is finally set in operative position in the casing as shown in Figure 1, with the cover 13 secured to the casing, the holding spring 48 will maintain a constant pressure on the floating upper plate 27 and thus keep the stack of discs under a moderate degree of compression.

I find that, under varying conditions and with different types of liquid, there may be substantial endwise expansion and contraction in the stack 29, which variation is taken care of automatically by a sliding movement of the top plate, but with the top plate always sealed by the O-ring 37 against leakage of liquid from the outer portion of the casing into the central opening of the filter stack at the point of juncture of the top plate 27 and the tube 26.

The use of the relief valve 42 in the filter unit is optional with filtering devices of this character and forms no part of the present invention.

Although the specific embodiment of filter shown in the drawings is designed to direct the flow of liquid from the exterior to the interior of the stack, it will be obvious to those skilled in the art that the filter can, with slight modification, be rearranged so that the flow of liquid can be reversed therethrough and passed for filtering from the interior to the exterior of the stack.

Although I have shown and described a practical and operative device, obviously other changes could be made in my invention by those skilled in the art to which the invention pertains and therefore I do not wish to be limited excepting as set forth in the appended claims.

I claim:

1. A filter stack for filters consisting of a plurality of discs of fibrous sheet filtering material, all of said discs having central apertures, the portions of certain of said discs surrounding their central apertures being uncut, and the portions of the other discs surrounding their central apertures each being formed in a series of similar radially disposed crenelated loops of substantially equal shape and consisting of a continuous recurrent web of filtering material, said loops being open along their outer sides to the periphery of said disc and open along their inner sides to the central opening of the disc, said uncut discs being stacked alternately with said looped discs, and with successive looped discs disposed with their inwardly looped openings registering axially with the outwardly looped openings of the preceding looped discs in the stack.

2. A filter stack in accordance with claim 1, wherein the central apertures of the discs are of substantially equal-sided polygonal shape, the loops are of substantially equal shape, and the number of loops and the number of sides of the polygon are unequal to cause the loops of successively looped discs to assume non-registering positions relative to each other when said discs are stacked with the sides of their central apertures in circumferentially-shifted, but mutually registering, relation.

3. A filter stack in accordance with claim 2, wherein the number of loops of each disc is unequal and the number of sides of the central polygonal aperture are equal, and at least one of said loops is disposed centrally of one side of the aperture.

JOHN VOCELKA.

REFERENCES CITED

The following references are of record in the file of this patent:

UNITED STATES PATENTS

| Number | Name | Date |
|---|---|---|
| 2,495,095 | Ewbank | Jan. 17, 1950 |
| 2,519,506 | Russell | Aug. 22, 1950 |
| 2,522,502 | Clark | Sept. 19, 1950 |
| 2,548,584 | Briggs | Apr. 10, 1951 |